No. 664,338. Patented Dec. 18, 1900.
H. H. SPRAGUE.
DEVICE FOR PRACTICING GOLF.
(Application filed Mar. 29, 1900.)

(No Model.)

WITNESSES:
H. A. Lamb
L. R. Hoyt

INVENTOR
Henry H. Sprague.
BY Geo. D. Phillips.
His ATTORNEY.

UNITED STATES PATENT OFFICE.

HENRY H. SPRAGUE, OF BRIDGEPORT, CONNECTICUT.

DEVICE FOR PRACTICING GOLF.

SPECIFICATION forming part of Letters Patent No. 664,338, dated December 18, 1900.

Application filed March 29, 1900. Serial No. 10,628. (No model.)

*To all whom it may concern:*

Be it known that I, HENRY H. SPRAGUE, a citizen of the United States, and a resident of Bridgeport, in the county of Fairfield and State of Connecticut, have invented certain new and useful Improvements in Devices for Practicing Golf, of which the following is a specification.

My invention relates to a device for the practice of golf whereby a player may increase his skill and perfect his play without resorting to the use of balls or the golf-grounds for that purpose.

My invention consists of a target which can be so placed on the floor as to occupy a position similar to that of a golf-ball on an ordinary "tee," and when struck with a golf-club having inserted in the central portion of its vertical face a sharp-pointed instrument the target will be pierced by this instrument and lifted from its support.

The most important requisite in the skilful playing of the game of golf is the ability to strike accurately the center of the ball with the center of the striking-face of the club. To acquire this ability is both tedious and difficult, and the main object of my invention is to facilitate the acquirement of this ability. The pierced holes in the target show at a glance the accuracy or inaccuracy of the stroke and mark graphically the skill displayed. Knowing this, it is comparatively easy to mend the play.

The device is always ready, can be played indoors, regardless of weather, in a very limited space, and surrounding breakables are in no way endangered from any parts of the device set flying by the force of the stroke.

In practicing with this device the same position is taken and the same stroke both as to swing and force is used as on the golf-grounds in an actual game. The first thing necessary in playing golf being to strike the ball properly, the next is to give it the right direction. The first is readily acquired by my device, together with the same amount of exercise in doing so as prevails on the golf-grounds.

Figure 1:
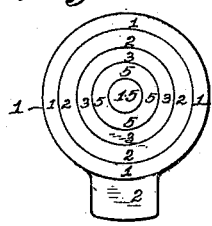
Figure 2:
Figure 3:
Figure 4:
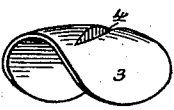
Figure 5:
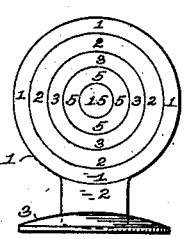
Figure 6:
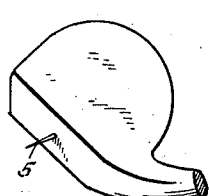
Figure 7:
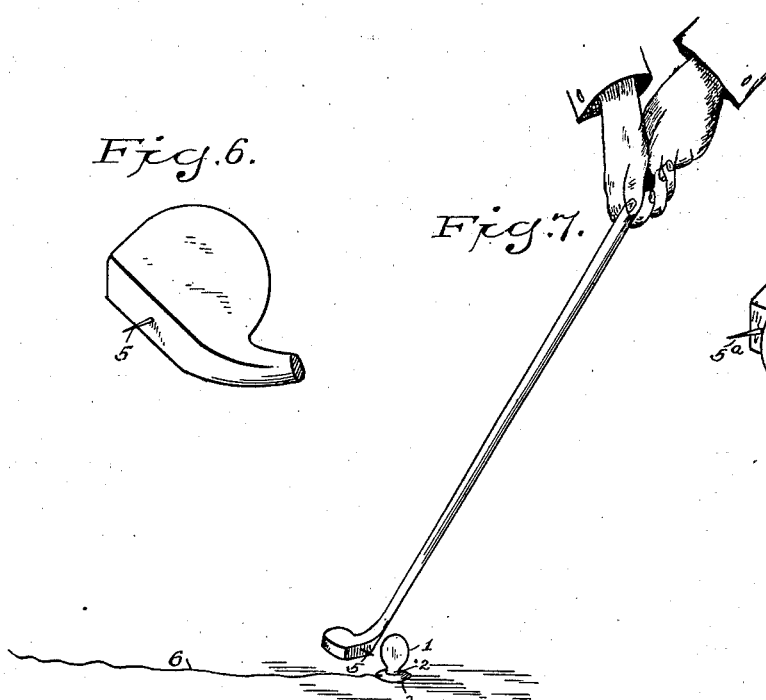
Figure 8:
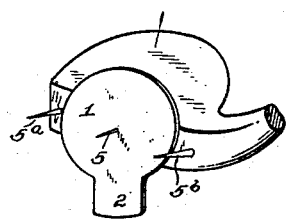
Figure 9:
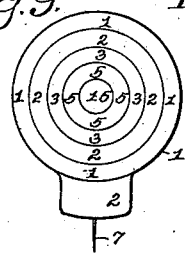

Figure 1 represents a front elevation of the target; Fig. 2, an edge elevation. Fig. 3 is a perspective view of the tee having a cut therein to admit the tang of the target, said cut or mouth being closed. Fig. 4 is a perspective view of the tee with the mouth open. Fig. 5 is a front elevation of the target mounted in the base or tee. Fig. 6 is a club-head with a pointed pin or picker inserted in the striking-face thereof. Fig. 7 represents the target in position on the floor and the club in striking position. Fig. 8 represents the target impaled on the picker after the stroke is completed. Figs. 9, 10, 11, 12, and 13 represent modified forms for holding the target in an upright position.

The construction and operation are as follows:

1 represents a target made of any material that is capable of being pierced by the impact of a sharp instrument under the influence of a sweeping blow. The target is provided with the tang 2, by means of which it is connected to its support. In order to get the full benefit for which my device is intended, it is essential that the same conditions should exist as far as possible as exist on the golf-grounds. Therefore this tang on the target is made just long enough to raise the center of the target the same distance from the ground as to the center of a golf-ball when placed on an ordinary tee.

3, Fig. 3, represents a rubber supporting-base, flat on the bottom and convex on its upper side. 4 is a cut formed in this convex surface, adapted to receive the tang 2 of the target, as shown at Fig. 5. Pressing the edges of said base downward and opposite the longitudinal formation of the cut 4 will open such cut for the insertion of said tang. Releasing this pressure will cause the base to assume its normal shape and close the cut or opening against said tang and hold it firm enough to enable the sharp-pointed pin 5 in the golf-club to pierce the target and lift it from its support.

The target can be divided into rings, as shown, and such rings numbered, so that the player can readily see what portion of the target has been struck. In this case the lower ring would be a continuation of the circular formation of the target. Therefore the distance from this ring to the under side of the base will represent the approximate height of the little mound of earth called the "tee" on which the ball is placed on the golf-grounds.

In order to become proficient in playing golf, it is necessary that the player should be able to strike the ball directly in the center, and the impact on the club must be at the center of its vertical face. Therefore I have placed the pin 5 at this central point of impact. It will thus be seen that if a player can successfully pierce the target centrally in the practice of my device there will be no difficulty in striking the ball centrally when on the golf-grounds, as the conditions are precisely the same.

In Fig. 7 I have shown the target in position to receive the blow of the approaching club, and if such blow is properly aimed the pin will pierce the target and lift it out of its support and leave it suspended from said pin, as shown at Fig. 8. In order to be able to pierce a target offering such a slight resistance as leather, paper, or other like material and the slight resistance such a target must necessarily offer by means of its temporary support, it is absolutely necessary that the same full, strong, and sweeping stroke must be given as prevails on the golf-grounds, so that in point of exercise it has the same advantage.

Figure 13:
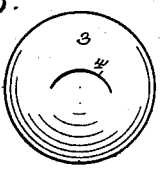

While any suitable material can be used for the targets that can be pierced by the pin carried by the club, leather is less liable to tear and will stand more fatigue. As leather is pliable, it would be advantageous to dip the tang 2 in glue to impart a stiffness thereto, and thus avoid any tendency to lop over when in the support shown at Figs. 3, 4, 5, and 6. In Fig. 13 the cut in the support is of a semicircular form, which would so cramp the tang that no stiffness therein would be necessary.

If desired, the string 6, Fig. 7, could be attached to the base 3 and the other end of said string secured to a chair-leg or other convenient place, so that should the player miss the target and hit the base it cannot fly beyond the length of the string and do damage among the bric-à-brac in a room.

In playing regular golf on the grounds the pin 5 is of course removed and the club used in striking the ball. Thus the player has the advantage of the same club in both cases, as before mentioned.

Figure 10:
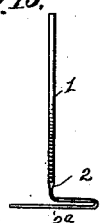
Figure 11:
Figure 12:
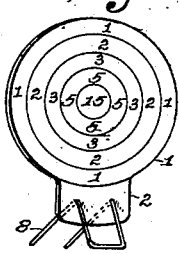

Figs. 9, 10, 11, and 12 represent several modified constructions of the base. In Fig. 1 the pin 7 is used. In Fig. 10 the tang 2 is made long enough to fold upon itself and form the foot $2^a$. In Fig. 11 the tang is forked, so as to form a support. In Fig. 12 the wire support 8 passes through the tang, and the free ends of said wire are turned down to form supporting-legs. None of these, however, are equal to the rubber base, as such base cannot be injured by a blow, while any one of the modifications might be.

As before stated, the principal object of my invention is to enable a player to acquire the necessary skill to cause the impact between the club and ball to occur at the center of each, and until this skill is fully acquired no player can be considered proficient in striking a ball. In the practice of my device it is quite evident that unless the pin 5 pierces the target the beginner will not be able to determine whether the stroke was long or short—in other words, whether the target was struck with the heel or toe of the club. To more quickly overcome this tendency to strike wild, I have (see Fig. 8) placed the pin $5^a$ at the toe and the pin $5^b$ at the heel. Now if there is a tendency to overreach the pin $5^b$ will pierce and lift the target. So, also, if the blow is short the pin $5^a$ will also show the result on the target. If necessary, a pin could be placed under the central pin 5 and close to the lower edge of the club, which would enable the player to see if the target had been topped. Of course if a blow were delivered too low the club would strike the supporting-base, and this of itself would be a sufficient indication of that fact.

The exact shape of the tang 2 need not be strictly adhered to, as any shape would answer the purpose so long as the whole target remains exposed to receive the blow.

Having thus described my invention, what I claim as new, and desire to secure by Letters Patent, is—

1. A device for the practice of golf, consisting of a target constructed of material capable of being pierced by the impact of a sharp instrument, a base adapted to rest on the floor and engage with the lower portion of said target only, a golf-club, a sharp-pointed pin in the face thereof, said pin adapted, under a swinging blow of said club, to pierce said target and lift it clear of said floor, for the purpose set forth.

2. A device for the practice of golf, consisting of a target constructed of material capable of being pierced by the impact of a sharp instrument, the circular form of said target being of the same diameter as an ordinary golf-ball, a tang projecting from such circular construction, a support in which said target is removably secured, a golf-club, a sharp-pointed pin in the face thereof, said pin adapted, under a swinging blow of said club, to pierce said target and lift it from its support, for the purpose set forth.

3. A device for the practice of golf, consisting of a removable target, a golf-club having one or more sharp-pointed pins in the straight vertical face thereof, said target constructed of material capable of being pierced by the impact of said pin and lifted by said club, for the purpose set forth.

4. A device for the practice of golf, consisting of a target constructed of material capable of being pierced by the impact of a sharp instrument, the circular form of said target being substantially the same diameter as an ordinary golf-ball, a tang projecting downward therefrom, a support to temporarily receive said tang so as to maintain said target in a vertical position, said tang and support representing a tee so that, the distance from the center of said target to the bottom of said support will equal, approximately, the distance from the center of a golf-ball to the base of its tee, for the purpose set forth.

5. In a device for the practice of golf, consisting of a target, a rubber support therefor, an opening in said support for the target, a golf-club carrying a sharp-pointed pin in its striking-face, said target constructed of material capable of being pierced by the impact of said pin and lifted clear of its support, for the purpose set forth.

Signed at Bridgeport, in the county of Fairfield and State of Connecticut, this 9th day of March, A. D. 1900.

HENRY H. SPRAGUE.

Witnesses:
SAMUEL G. MEEKER,
ISAAC M. STETSON.